(12) United States Patent
Johnston et al.

(10) Patent No.: US 8,945,499 B2
(45) Date of Patent: *Feb. 3, 2015

(54) PROCESS FOR PRODUCING AMMONIUM NITRATE

(75) Inventors: Anthony Matthew Johnston, Double Bay (AU); Brian Scott Haynes, Frenchs Forest (AU); Gregory Lawrence Conroy, Coogee (AU)

(73) Assignees: Orica International Pte Ltd, Singapore (SG); The University of Sydney, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/878,743

(22) PCT Filed: Dec. 1, 2011

(86) PCT No.: PCT/AU2011/001556
§ 371 (c)(1),
(2), (4) Date: Jul. 12, 2013

(87) PCT Pub. No.: WO2012/071616
PCT Pub. Date: Jun. 7, 2012

(65) Prior Publication Data
US 2013/0287670 A1 Oct. 31, 2013

(30) Foreign Application Priority Data
Dec. 1, 2010 (AU) .................. 2010905289

(51) Int. Cl.
*C01C 1/18* (2006.01)
*C01B 21/40* (2006.01)
*C01B 21/26* (2006.01)

(52) U.S. Cl.
CPC ............ *C01C 1/185* (2013.01); *C01B 21/26* (2013.01)
USPC .......................................... 423/396; 423/393

(58) Field of Classification Search
CPC .......... C01C 1/18; C01C 1/185; C01C 21/20; C01C 21/24; C01C 21/26; C01C 21/262; C01C 21/38; C01C 21/40; C01C 21/48
USPC ........... 423/390.1, 392–394.2, 403, 396, 393, 423/395; 71/50
See application file for complete search history.

(56) References Cited

U.S. PATENT DOCUMENTS 1,378,271 A 5/1921 Partington
1,744,652 A * 1/1930 Liljenroth ................. 423/392
(Continued)

FOREIGN PATENT DOCUMENTS

CN 102001635 A 4/2011
DE 1900861 A1 9/1970
(Continued)

OTHER PUBLICATIONS

Perry's Chemical Engineers' Handbook, "Heat-Transfer Equipment," 2008, McGraw-Hill, Eight Edition, pp. 11-85 to 11-87.*
(Continued)

*Primary Examiner* — Stanley Silverman
*Assistant Examiner* — Justin Bova
(74) *Attorney, Agent, or Firm* — Wilson Sonsini Goodrich & Rosati

(57) ABSTRACT

A process for producing ammonium nitrate is disclosed, which process comprises exposing a gaseous oxidiser feed composed at least substantially of ammonia, steam and an oxidising gas to conditions whereby the ammonia is oxidised to produce a reaction mixture including nitrogen monoxide and water vapour. The reaction mixture is cooled in a heat exchanger whereby the nitrogen monoxide is oxidised, the water vapour is condensed and the products of the nitrogen monoxide oxidation react with and are absorbed by the condensed water to form a nitric acid stream, with substantially all of the nitrogen monoxide in the reaction mixture being converted to nitric acid. The nitric acid stream is reacted with a stream of ammonia to form the ammonium nitrate.

31 Claims, 7 Drawing Sheets

(56) References Cited

U.S. PATENT DOCUMENTS

| | | | |
|---|---|---|---|
| 1,949,462 A | | 3/1934 | Fogler |
| 2,132,663 A | | 10/1938 | Voogd |
| 2,578,674 A | | 12/1951 | Daniels et al. |
| 3,102,788 A | | 9/1963 | Newman |
| 3,110,563 A | | 11/1963 | Krauss et al. |
| 3,489,515 A | | 1/1970 | Jockers et al. |
| 3,560,147 A | | 2/1971 | Janiczek et al. |
| 3,584,998 A | * | 6/1971 | Green ............ 423/352 |
| 3,620,282 A | * | 11/1971 | Frank Newton ............ 159/13.4 |
| 3,634,031 A | | 1/1972 | Hellmer et al. |
| 3,915,675 A | | 10/1975 | Scheibler et al. |
| 3,927,182 A | | 12/1975 | Powell |
| 4,081,518 A | | 3/1978 | Selin et al. |
| 4,309,396 A | | 1/1982 | Herbrechtsmeier et al. |
| 5,266,291 A | * | 11/1993 | Drnevich et al. ............ 423/392 |
| 5,985,230 A | | 11/1999 | Vlaming et al. |
| 6,117,406 A | * | 9/2000 | Vogel et al. ............ 423/310 |
| 7,364,711 B2 | | 4/2008 | Wessel et al. |
| 2002/0127932 A1 | | 9/2002 | Neumann et al. |
| 2003/0143148 A1 | | 7/2003 | Maurer |
| 2005/0106092 A1 | | 5/2005 | Dziobek et al. |
| 2009/0020263 A1 | * | 1/2009 | Ohsawa et al. ............ 165/104.11 |
| 2011/0002836 A1 | | 1/2011 | Dubois et al. |
| 2013/0294998 A1 | | 11/2013 | Johnston et al. |

FOREIGN PATENT DOCUMENTS

| | | |
|---|---|---|
| DE | 10302955 A1 | 8/2004 |
| DE | 102005006027 A1 | 8/2006 |
| GB | 869062 A | 5/1961 |
| GB | 1028202 A | 5/1966 |

OTHER PUBLICATIONS

International search report dated Feb. 15, 2012 for PCT/AU2011/001556.

International search report dated Feb. 15, 2012 for PCT/AU2011/001555.

Office action dated Sep. 6, 2013 for U.S. Appl. No. 13/878,747.

Office action dated Feb. 4, 2014 for U.S. Appl. No. 13/878,747.

Office action dated Jun. 13, 2014 for U.S. Appl. No. 13/878,747.

Office action dated Oct. 23, 2014 for U.S. Appl. No. 13/878,747.

* cited by examiner

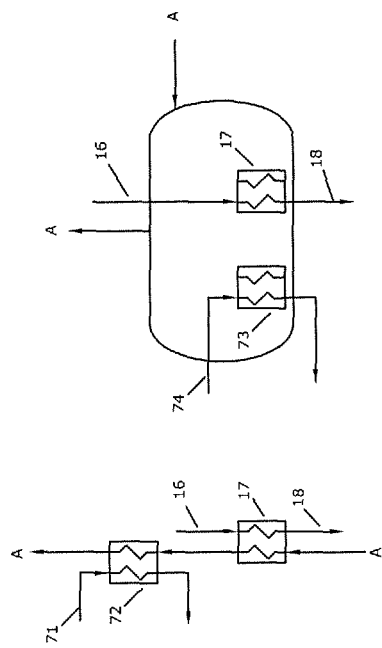

PROCESS FOR PRODUCING AMMONIUM NITRATE

CROSS-REFERENCE

This application is a national phase application of PCT Application No. PCT/AU2011/001556, which was filed on Dec. 1, 2011, which claims priority to Australian Patent Application No. 2010905289 filed on Dec. 1, 2010, both of which are incorporated herein by reference in their entirety.

TECHNICAL FIELD

A process for producing ammonium nitrate is disclosed, in particular, a process that integrates production of nitric acid with production of the ammonium nitrate.

BACKGROUND

Ammonium nitrate conventionally is manufactured by reacting nitric acid and ammonia feeds that are independently supplied from separate sources. The manufacturing process typically involves reacting the nitric acid and ammonia in a neutralisation vessel or, more usually, in a pipe reactor and, in the interest of producing concentrated ammonium nitrate solution (for example of the order of 80% concentration), nitric acid having a concentration of 50% to 68% or greater typically is employed in the process. However, as is well understood in the industry, this level of acid concentration leads to a violent exothermic reaction, this in turn imposing rigorous demands on processing apparatus.

The nitric acid component conventionally is manufactured by the Ostwald Process which, in basic reaction terms, involves a three-stage process comprising, firstly, oxidising ammonia in the presence of air by effecting rapid high temperature catalytic conversion of the ammonia-air mixture to produce nitrogen monoxide. The resultant stream is cooled (usually under pressure) and some of the nitrogen monoxide reacts non-catalytically with oxygen to form such higher oxides of nitrogen as nitrogen dioxide and its dimer; the mixture of which is referred to below as nitrogen dioxide and the resultant stream as a whole being referred to as nitrous gas. Following further cooling, the nitrous gas is admitted to a counter-flow absorption process to produce the nitric acid.

The absorption process is performed within an absorption tower, with the product acid concentration typically being between 50% and 68%, depending upon the operating pressure of and the number of absorption stages in the absorption tower, and the concentration of nitrogen oxides entering the absorption tower. The nitrous gases normally are relatively dilute because of the presence of nitrogen introduced in the air and, hence, a large absorption tower typically is required to facilitate reaction and absorption.

It has now been determined that, with substantial modification of the above described conventional nitric acid manufacturing process, including oxidation of the ammonia in the presence of oxygen, admission of water ballast prior to the ammonia oxidation stage, retention of the water ballast throughout the process and with acceptance of end product in the form of dilute nitric acid (for example having a concentration of the order of 20% to 40%), an absorption stage may be adopted that utilises heat exchange technology and which obviates the conventional requirement for an absorption tower and its attendant disadvantages. This then facilitates integration of the two (hitherto separate) processes of nitric acid production and subsequent ammonium nitrate production.

SUMMARY OF THE DISCLOSURE

Broadly defined, a process for producing ammonium nitrate is disclosed. The process comprises:
exposing a gaseous oxidiser feed composed at least substantially of ammonia, steam and an oxidising gas to conditions whereby the ammonia is oxidised to produce a reaction mixture including nitrogen monoxide and water vapour, and cooling the reaction mixture in a heat exchanger whereby the nitrogen monoxide is oxidised, the water vapour is condensed and the products of the nitrogen monoxide oxidation react with and are absorbed by the condensed water to form a nitric acid stream, with substantially all of the nitrogen monoxide in the reaction mixture being converted to nitric acid; and
reacting the nitric acid stream with a stream of ammonia to form the ammonium nitrate.

The above process also provides ammonium nitrate (in any of its various possible forms).

The term "oxidising gas" as used in the above and following definitions of the invention is to be understood as meaning a gas containing more than about 80% oxygen. The oxidising gas desirably contains at least 90% and, depending upon processing plant size, most desirably at least 95% oxygen.

Also, by "substantially all" of the nitrogen monoxide in the above and following definitions of the invention is meant an amount of nitrogen monoxide greater than 90%, desirably greater than 95% and, most desirably, up to a level approaching as near as possible 100% of that present in the reaction mixture. When conversion within the heat exchanger occurs at a level lower than that which is most desired, the reaction-absorption process may be continued in a subsequent reactor-absorber vessel or pipe, with or without heat exchange. Thus, conversion approaching 100% in the heat exchanger is not essential because the reaction-absorption process may be continued, beyond that which occurs in the heat exchanger, in a subsequent adiabatic reactor-absorber, albeit to a limited extent. That is, it is known that higher temperatures are deleterious to nitrogen monoxide conversion and absorption and, to the extent that subsequent reaction-absorption is undertaken adiabatically, substantial temperature rises can occur in the reacting stream. For example, progressing from 99% to 100% nitrogen monoxide conversion adiabatically would entail a temperature rise of the order of 2.5° C., whereas progressing from 90% to 100% conversion would entail a temperature rise of 24° C.

Also, the term "concentration" as used within this specification is to be understood as meaning:
in the context of aqueous solutions—the percentage of pure solute (e.g., ammonium nitrate or nitric acid) in a solution on a w/w basis, and
in the context of gaseous mixtures—the percentage of pure component (e.g., oxygen) in a mixture on a v/v basis.

The nitric acid produced within the above defined process will inherently be dilute, having for example a concentration of the order of 20% to 40%, depending upon the amount of water that is contained in the reaction mixture. As a consequence, the ammonium nitrate produced by initial reaction of the dilute nitric acid and ammonia in the integrated process also will have a relatively low concentration (e.g., of the order of 30% to 46%) but the ammonium nitrate may be concentrated up (e.g., to a level of the order of 75% to 85%) by addition of heat, (which may be derived from the nitric acid producing stage as described below), to drive off excess water introduced by the dilute nitric acid.

Heat for concentrating the ammonium nitrate solution may be transferred to the ammonium nitrate producing stage by direct heat exchange between the reaction mixture (that is derived from ammonia oxidation within the nitric acid producing stage) and the ammonium nitrate solution, or by indirect heat exchange between the two stages using an intermediate coupling loop of a heat transfer medium such as water or steam/water. Such heat may also or alternatively be derived from the heat of reaction between the ammonia and the nitric acid and/or from an external source.

Also, steam generated in the course of concentrating the ammonium nitrate solution in the ammonium nitrate producing stage may be transferred to the nitric acid producing stage to form at least a portion of the steam component of the oxidiser feed or to form at least a portion of a water or steam component of a starting feed from which the oxidiser feed is derived.

The heat exchanger that is employed in the absorption process in the nitric acid producing stage may comprise any type of heat exchanger that provides for heat transfer from a process fluid (in the present invention the reaction mixture) to a coolant fluid; for example a shell-and-tube type heat exchanger, a printed-circuit type heat exchanger, a plate type heat exchanger or a fin-fan type heat exchanger. Fluid flow passages within the heat exchanger desirably have a small cross-sectional dimension (e.g., less than about 3 mm and desirably less than 2 mm equivalent diameter) in order to assist heat an mass transfer and to facilitate heat exchanger compactness. Also, depending upon processing demands, a single heat exchanger may be employed or two or more heat exchangers may be connected in parallel or in series, and the expressions "a heat exchanger" and "the heat exchanger" as employed in this specification are to be understood in this context. The coolant fluid may comprise a gas, for example fan forced air, or a liquid such as water.

The novel employment of the heat exchanger to complete the absorption in the absorption stage (as distinct from the employment in the prior art processes of a counter-current absorption tower) results in the production of relatively dilute nitric acid. Such acid has low equilibrium vapour pressures of nitric acid and nitrous gases, this obviating the need for counter-current contacting to achieve complete absorption of these components. Nevertheless, the rate at which the conversion of nitrogen monoxide to acid occurs, as the process nears completion, is determined principally by the chemical rate of oxidation of nitrogen monoxide, which is strongly promoted by higher concentrations of nitrogen monoxide and oxygen. In the process of the present invention the steam that is employed to ballast the oxidation process substantially condenses during the course of the absorption process to form a part of the dilute nitric acid product, thereby increasing the concentration of the residual gaseous reactants and facilitating their relatively rapid reaction and absorption. The effect is to intensify the reaction/absorption process, which effect is greatest when, as in accordance with one embodiment of the invention, the oxidising gas composition is close to 100% oxygen.

Steam in the oxidiser feed serves to maintain the oxidiser feed below the explosive limit for ammonia-oxygen mixtures and to moderate the temperature rise during ammonia oxidation, as well as to function, when condensed, to absorb the products of the nitrogen monoxide oxidation.

The oxidising gas (hereinafter referred to as "oxygen") in the starting/oxidiser feed may be provided in an amount sufficient to oxidise substantially all of the ammonia and substantially all of the nitrogen monoxide. Alternatively, the oxygen in the feed may be provided in an amount sufficient to oxidise substantially all of the ammonia and additional oxygen be added to the reaction mixture before the water vapour condenses in order to oxidise substantially all of the nitrogen monoxide.

A starting feed (from which the oxidising feed is obtained) may be provided with all of the ammonia, oxygen and water in gaseous states. Also, the starting feed may be provided by mixing oxygen into ammonia/steam, by mixing ammonia into oxygen/steam, or by mixing the separate constituents oxygen, ammonia and steam, but the risk of forming an explosive mixture desirably is avoided by not mixing steam into ammonia/oxygen.

In an alternative embodiment, when the starting feed is provided with water in a liquid state it may be vaporised either prior to or following mixing with the other two components of the starting feed.

In a further embodiment, the ammonia may be dissolved in the water to form aqueous ammonia and, in the event that excess recycled aqueous ammonia is injected back into the starting feed (as will be hereinafter described), the ammonia may be dissolved in the water/recycled aqueous ammonia feed. The resultant feed may then be heated to vaporise the aqueous ammonia.

In the ammonia oxidation stage (where the steam-ballasted ammonia-oxygen feed is oxidised to form, predominantly, nitrogen monoxide within nitrous gas), the oxidiser feed may be heated to a temperature falling within the range 700° C. to 1000° C. (typically about 800° C.), at a pressure falling within the range 1 bar (abs.) to 15 bar (abs.) (typically about 2 bar (abs.)) in the presence of a catalyst. The catalyst may be embodied in any known type of catalytic system, including a cobalt oxide bed or a platinum-rhodium catalyst in the form of woven or knitted gauze layers. The heating of the oxidiser feed in the oxidiser may be brought about by the adiabatic heat release of the reaction, or by heat exchange with an external fluid, or by a combination of both. When heat exchange is effected for heating or for cooling, the oxidiser may comprise a heat-exchanger reactor.

The reaction mixture from the ammonia oxidation process may be cooled to a first temperature above the dew point of the reaction mixture (e.g., to a temperature of about 140° C.) by heat exchange with a heat transfer fluid. That heat transfer fluid may be employed to transfer heat (as above mentioned) for concentrating (by evaporation) the ammonium nitrate solution in the ammonium nitrate producing stage. Also, the reaction mixture may be further cooled to a second temperature by heat exchange with a heat transfer fluid or other process fluid. The latter heat exchange may be effected between the reaction mixture and the oxidiser or starting feed (or components of the oxidiser/starting feed) (which in such case becomes the heat transfer fluid) by what is referred to herein as feed-effluent heat exchange, utilising a feed-effluent heat exchanger. Such feed-effluent heat exchanger may be separate from or be integrated with the previously mentioned heat exchanger in which the products of the nitrogen monoxide oxidation react with and are absorbed by condensed water.

In some embodiments in which feed-effluent heat exchange is effected, any liquid component in the starting feed may be vaporised (at least partially) and any liquid component remaining in the starting feed following the feed-effluent heat exchange may be recirculated or, using previous terminology, recycled. By this process most of any liquid in the starting feed may be evaporated to the gaseous phase (as required for the oxidiser feed) using what might be regarded as "low grade" heat, leaving "higher grade" heat that is generated within the process for such ancillary purposes as steam-raising for power generation. Accumulation of dissolved solids in the recirculating liquid may be prevented by provision of a blow-down stream.

The oxidation of the nitrogen monoxide and concurrent reactions leading to the formation of the nitric acid are governed by the operating pressures and temperatures appropriate to system design and, at least in the final absorption phase, by the temperature of available coolant. Oxidation occurs only to a limited extent until post-oxidation cooling is initiated, that is (from the previously exemplified figures) at temperatures as high as 800° C. When the reaction mixture is cooled, the first liquid will form at the dew point at the operating pressure and the formation of acid will continue as the mixture is further cooled. At an operating pressure of about 15 bar (abs.) condensate will form and, thus, formation of nitric acid will commence, at the corresponding saturation temperature of about 200° C., and the acid formation will continue down to a temperature of about 50° C., assuming the latter temperature to be limited by the available coolant fluid temperature. For operation at 2 bar (abs.), the formation of acid will commence at about 110° C.

Gaseous impurities not condensed or absorbed in the absorbing phase in the nitric acid producing stage may include excess unreacted oxygen, argon and other impurities introduced with the oxygen feed to the process, and nitrogen and nitrous oxide formed as by-products in the oxidiser. These gaseous impurities may be separated from the nitric acid by way of a separation vessel before the nitric acid and ammonia are reacted in the ammonium nitrate producing stage.

The nitric acid absorber pressure may, in some embodiments, be below the ammonium nitrate reactor pressure, and the nitric acid will then be pumped to the reactor pressure. In other embodiments, the nitric acid absorber pressure may be above the ammonium nitrate reactor pressure and a valve may then be used to reduce the nitric acid pressure to the reactor pressure.

Reaction of the nitric acid and ammonia in the ammonium nitrate producing stage may be effected by any method known in the art, including, for example, by co-flowing the reactants adiabatically through a suitable length of pipe. The reaction might alternatively be effected in a non-adiabatic (heat exchange) reactor, in which the (co-flowing) reactants will be heated or cooled by a heat transfer medium. As a further alternative, the reaction may be effected by mixing the ammonia and nitric acid in a vessel which may, as required, either be heated or cooled. The reactor may also function as an evaporator.

The nitric acid may be heated prior to reacting with the ammonia. In this way, at least some of the heat released by the reaction may result in the generation of steam, rather than result simply in preheating of the ammonium nitrate stream to a temperature below the boiling point in an evaporator (in which the ammonium nitrate solution is concentrated and steam is generated by the application of heat). Such preheating of the nitric acid may be effected by heat transfer from hot streams within the nitric acid producing stage, for example from the reaction mixture stream from the oxidiser or from a liquid recycle stream.

The ammonia may be fed to the ammonium nitrate producing stage in liquid or gaseous form or as aqueous ammonia. The feed pressure will need to be at least as high as that of the nitric acid feed stream at the point of mixing, and the ammonia may be at any convenient temperature, typically at about ambient temperature.

The pressure of the ammonia feed to the nitric acid and ammonium nitrate producing stages may be selected to meet individual process requirements. For example, in some embodiments the ammonia will be supplied to the nitric acid producing stage slightly above the oxidation pressure, and to the ammonium nitrate producing stage slightly above the absorber pressure (prior to any pump that may be employed to elevate the liquid pressure).

In some embodiments the ammonia may, as above indicated, be supplied in gaseous form, and be fed to the ammonium nitrate producing stage at the same pressure as it is fed to the nitric acid producing stage. In some embodiments, the common pressure of the gaseous ammonia feed to the integrated process may be slightly above the higher of the reactor and oxidiser pressures. In other embodiments the common supply pressure for the gaseous ammonia to the integrated process may be independent of the operating pressures of the oxidiser, absorber and reactor, and its pressure may be close to, or even below, atmospheric pressure.

It is desirable that the ammonia flow rate be sufficiently high, relative to the nitric acid flow, as to ensure that there is an excess of ammonia in the ammonium nitrate solution in the evaporator. In this way corrosion within the evaporator will be minimised, and the partial pressure of the nitric acid in the vapour space of the evaporator will be suppressed.

Depending upon system requirements, the evaporator pressure may be operated slightly above the ammonia combustor pressure or close to (either above or below) atmospheric pressure. In order to avoid the possibility of air infiltration into the evaporator when running under vacuum, the evaporator may be operated at, for example, 1 bar (abs.) to 1.5 bar (abs.) Operation of the evaporator at such pressures is possible when the steam from the evaporator is condensed and returned to the nitric acid process as liquid. (It is observed that pumping liquid water to the ammonia combustor pressure incurs little equipment or energy cost.)

The temperature of the evaporation will depend upon the evaporation pressure and ammonium nitrate solution concentration. For example, the bubble point of 39% ammonium nitrate solution at 1 bar is 107° C., whereas the bubble point of 80% ammonium nitrate solution at 3 bar is about 168° C. It is known that the heating of solid ammonium nitrate to a temperature of 170° C. or more carries with it the risk of rapid decomposition of the ammonium nitrate, and is to be avoided. Therefore, for a product strength of, for example, the order of 80% ammonium nitrate, the evaporator will practically be limited to operation below 3 bar (abs.).

Heat may be transferred (as above mentioned) from the nitric acid reaction mixture to the ammonium nitrate solution within the evaporator by direct heat exchange contact between the streams, or indirectly by means of a heat transfer medium in an intermediate coupling loop; which may, for example, comprise a boiling/condensing water circuit or a single-phase pressurised water circuit. An intermediate heat transfer coupling loop may be employed to avoid the risk of excessively high wall temperatures (>170° C.) occurring in a heat exchanger which directly couples the hot reaction mixture (at, for example, 800° C.) with the boiling ammonium nitrate stream. If insufficient heat is available from the nitric acid reaction mixture and the ammonium nitrate reaction to concentrate the ammonium nitrate to the required strength, heat from an external source may be supplied to the process, for example, by heating the heat transfer medium in the intermediate coupling loop.

The evaporation of water from the dilute ammonium nitrate solution may be effected in a variety of equipment configurations. For example, the evaporation of the dilute ammonium nitrate solution may be effected in a single pass-through (a once-through) evaporator heat exchanger.

Alternatively, boiling ammonium nitrate solution may be recirculated through the heat exchanger under the influence of gravity-driven buoyancy effects (i.e., natural circulation) or by pumping. For example, the evaporating heat exchanger may be submerged under the liquid level of boiling ammonium nitrate solution within a vessel, or form part of a thermosyphon loop external to a separator vessel.

In a further alternative the ammonium nitrate solution may be concentrated in a falling film evaporator.

In embodiments employing a boiling/condensing water intermediate heat transfer coupling loop, the steam saturation temperature must be above the bubble point of the required ammonium nitrate solution, for example, for 80% solution, above 152° C. in a 2 bar (abs.) evaporator, or above 127° C. in a 1 bar (abs.) evaporator. The mean temperature difference between the heating and boiling fluids in a once-through evaporator is greater than that between the fluids in a recirculating evaporator and, hence, the once-through evaporator may be smaller.

In embodiments employing a single phase intermediate heat transfer coupling loop and a recirculating evaporator, the heat transfer medium must circulate at temperatures above the bubble point of the required ammonium nitrate solution, with the examples as identified.

In embodiments employing a single phase intermediate heat transfer coupling loop and a once-through evaporator, the maximum temperature reached by the heat transfer medium must exceed the bubble point of the required ammonium nitrate solution, with the examples as identified above. However the minimum temperature of the heat transfer medium need only exceed the bubble point of the dilute ammonium nitrate solution from the ammonium nitrate reactor, for example, for 39% ammonium nitrate solution, above 129° C. in a 2 bar (abs.) evaporator, or above 107° C. in a 1 bar (abs.) evaporator. Thus, when a single-phase intermediate heat transfer loop is used with a once-through evaporator, heat may be extracted from the nitric acid reaction mixture at lower temperatures than with the above alternatives, thereby increasing the amount of heat recovered from the reaction mixture.

A further advantage of a once-through evaporator over a recirculating evaporator may be that the forced through-flow of ammonium nitrate solution may render it less prone to crystalline solids fouling than the submerged heat exchanger, where the pressure drops developed by natural circulation will typically be much lower than those arising with once-through flow, and hence less likely to clear developing obstructions.

The vapour and liquid phases from the evaporator may be separated in a separator vessel of any type known in the art. In order to assist the separation of liquid droplets from the evaporator steam, a demister pad or packing may be employed towards the upper end of the separator vessel, and, in order to avoid the deposition of solids on such a pad or packing, it may be sprayed with wash liquid. The wash liquid may comprise high purity water, such as is suitable for boiler feedwater, or a solution of nitric acid, ammonia or ammonium nitrate.

In a submerged or thermo-syphon recirculating evaporator, dilution arising from the spraying of the demister pad with wash liquid will not substantially affect the required evaporation temperatures, even though the heat load is increased, because the diluting water mixes with the recirculating solution. However, at the exit of a once-through evaporator the solution concentration achieved, and therefore the bubble point required, must be increased to the extent that the dilution effect is compensated for in that device.

Once-through and recirculating evaporators may be placed inside or outside of the vessel provided for steam/solution separation. Recirculating evaporators may be placed inside the vessel, under the liquid level, as submerged heat exchangers, or outside it, in external thermo-syphon or pumped loops. In general, it will be more convenient to replace or repair an external heat exchanger in the event of it being subject to fouling, corrosion or other damage.

As previously stated, steam that is generated in concentrating the ammonium nitrate solution within the ammonium nitrate producing stage may be transferred to the nitric acid producing stage to form at least a portion of the water feed component of the oxidiser feed or of a starting feed from which the oxidiser feed is derived.

In one embodiment the steam may be transferred in the gaseous state directly from the evaporator to the nitric acid producing stage. Provided that the evaporator operates at a pressure with at least a slight excess over the ammonia combustor pressure, no steam compression will be required.

In another embodiment, the evaporator steam may be condensed and be returned as liquid water feed to the nitric acid producing stage. In this case, no lower constraint will be placed on the operating pressure of the evaporator by the nitric acid process as liquid water may inexpensively be pumped to any required pressure. The return of liquid water to the nitric acid process also enables the opportunity for absorption of gaseous ammonia feed to the nitric acid process, thereby decreasing the required feed pressure of ammonia to the nitric acid process, typically to atmospheric pressure or less. As mentioned above however, the evaporator and ammonia supply pressures may nonetheless be above atmospheric pressure in order to avoid infiltration of the atmosphere into the process.

In an embodiment in which steam from the evaporator is condensed to water, the water may carry entrained non-condensable gases, such as hydrogen and nitrogen, which may have entered as impurities in the ammonia feed to the ammonium nitrate process. In some circumstances, for example when the entrained gases might interfere with the operation of a down-stream liquid pump, such gases may be vented from a phase separator following the steam condenser, leaving the condensate effectively gas-free.

In an embodiment in which no purely liquid water exists within the process, such as when the evaporator steam is returned to the nitric acid producing stage in the gaseous state, any excess of water produced in the evaporator may be discarded by venting it as steam. A deficiency of water in such a process may be made-up as liquid at some point in the integrated process, for example with the spray water applied to the demister pad described above, or as steam from an external source. When the water balance is maintained by adding liquid water to the evaporator, the load on the evaporator will be increased, as with the spray water as described above. When the water balance is maintained by adding liquid water to a water boiler following the ammonia oxidiser, the heat available to the evaporator is decreased.

In an embodiment in which evaporator steam is condensed to form the nitric acid process water feed, an excess or deficiency of ballast water may be accommodated by adding or extracting water in liquid form from the condensate stream, thereby avoiding any need to increase the evaporator load.

Gaseous impurities may, in operation of the system, enter into either the nitric acid producing stage or the ammonium nitrate producing stage with the ammonia feeds, with the oxygen feed and/or, if water make-up is required, with the water feed. Also, oxygen, nitrogen, argon and other gaseous impurities, that are not vented from a separator following the absorber, may pass from the nitric acid process to the ammonium nitrate process. However, in general, the reactive impurities, hydrogen and oxygen, will circulate within the integrated process until they react to form water in the ammonia combustor; and non-condensable, inert gaseous impurities, such as argon and nitrogen, will circulate until they reach a vent point, most probably at the acid separator following the nitric acid absorber.

Dissolved impurities may enter the process in make-up water, and may be discharged either with the ammonium nitrate product or as a blow-down from the water recycle within the nitric acid producing stage.

Under some circumstances it is possible that sufficient heat may not be available from the reaction mixture (produced in the nitric acid producing stage) to concentrate the ammonium nitrate solution to the required extent. Then, in the absence of another source of heat at sufficiently high temperature within the integrated process to drive the evaporation process, alternative measures, such as multiple-effect evaporation and/or the importation of heat from an external source may be adopted.

The process will be more fully understood from the following descriptions of:

three illustrative embodiments of processes for producing nitric acid alone, and two illustrative embodiments of integrated processes for producing nitric acid and, using the nitric acid, ammonium nitrate.

The descriptions are provided by way of example with reference to schematic circuit (flow) diagrams as shown in the accompanying drawings.

BRIEF DESCRIPTION OF THE DRAWINGS

In the drawings—

FIG. 5A illustrates an alternative type of ammonium nitrate reactor-concentrator that is associated with the integrated process of FIG. 5;

FIGS. 7 and 7A illustrate alternative arrangements for the supply of heat from an external source for the reaction/evaporating processes as shown in FIGS. 5 and 6.

DETAILED DESCRIPTION OF THE ILLUSTRATED EMBODIMENTS

Figure 5:
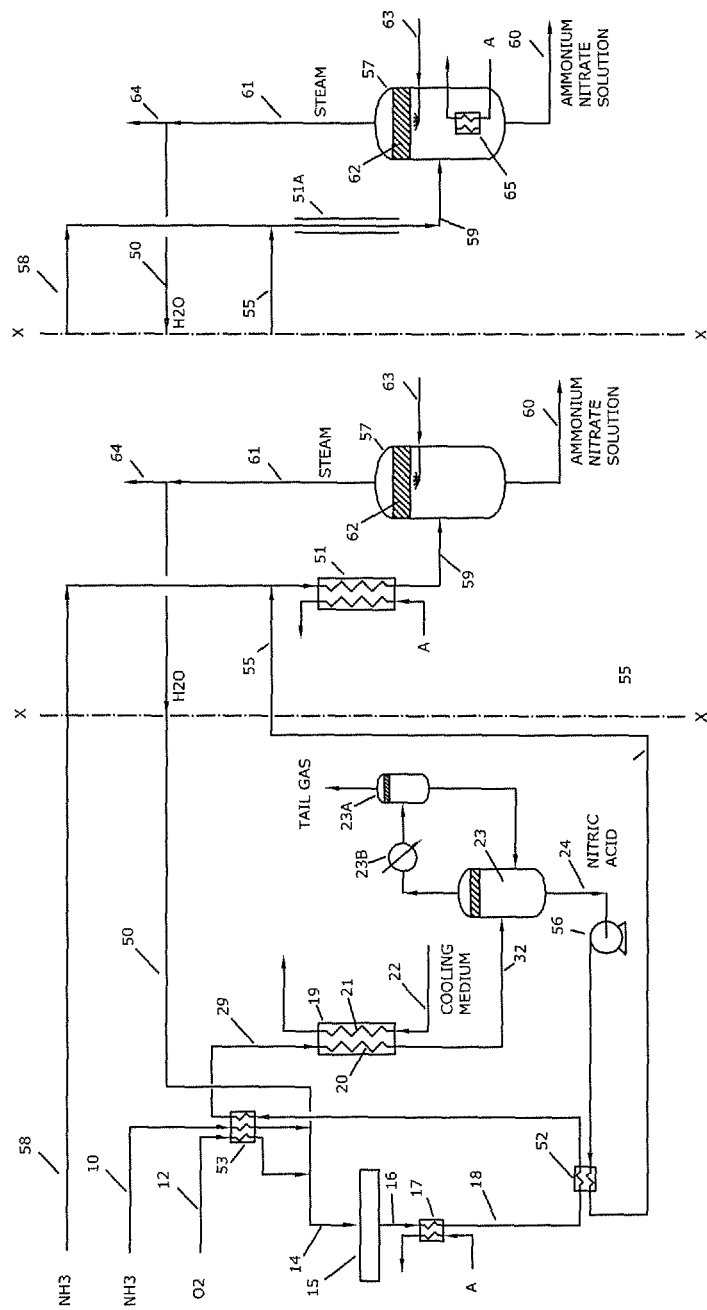
FIG. 5 shows a flow diagram applicable to a first embodiment of the integrated process for producing nitric acid/ammonium nitrate, the diagram illustrating one type of ammonium nitrate reactor-concentrator.
Figures 6, 6A:
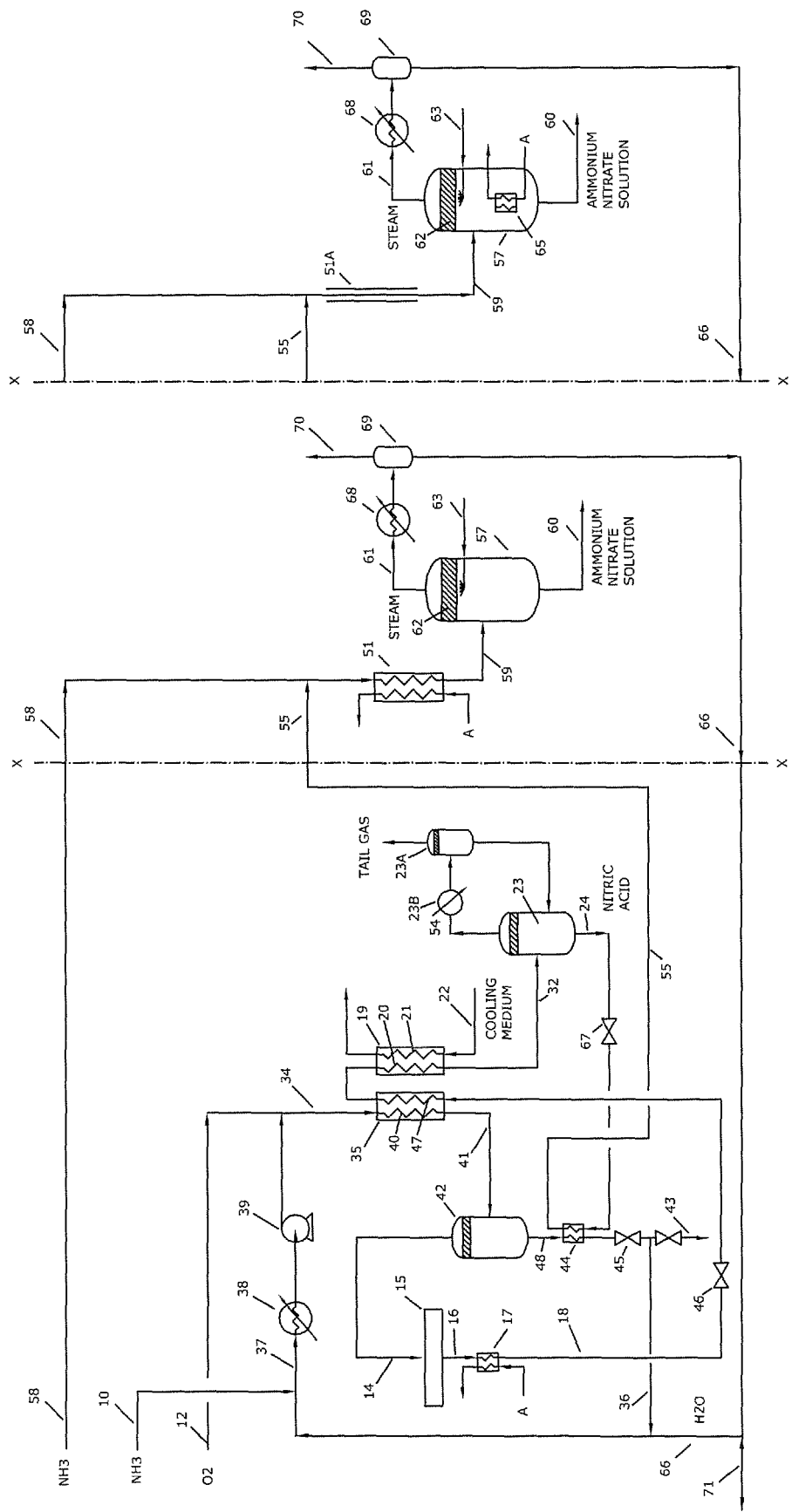
FIG. 6 shows a flow diagram applicable to a second embodiment of the integrated process for producing nitric acid/ammonium nitrate, the diagram illustrating one type of ammonium nitrate reactor-concentrator.
FIG. 6A illustrates an alternative type of ammonium nitrate reactor-concentrator that is associated with the integrated process of FIG. 6.

As a preliminary observation, the two embodiments of the integrated process (as shown in FIGS. 5 and 6) relate to the same process (as above defined); namely one in which:

ammonium nitrate is produced by the process of:

exposing a gaseous oxidiser feed composed at least substantially of ammonia, steam and an oxidising gas to conditions whereby the ammonia is oxidised to produce a reaction mixture including nitrogen monoxide and water vapour, cooling the reaction mixture in a heat exchanger whereby the nitrogen monoxide is oxidised, the water vapour is condensed and the products of the nitrogen monoxide oxidation react with and are absorbed by the condensed water to form a nitric acid stream;

and reacting the nitric acid stream with a stream of ammonia to form the ammonium nitrate.

Figure 1:
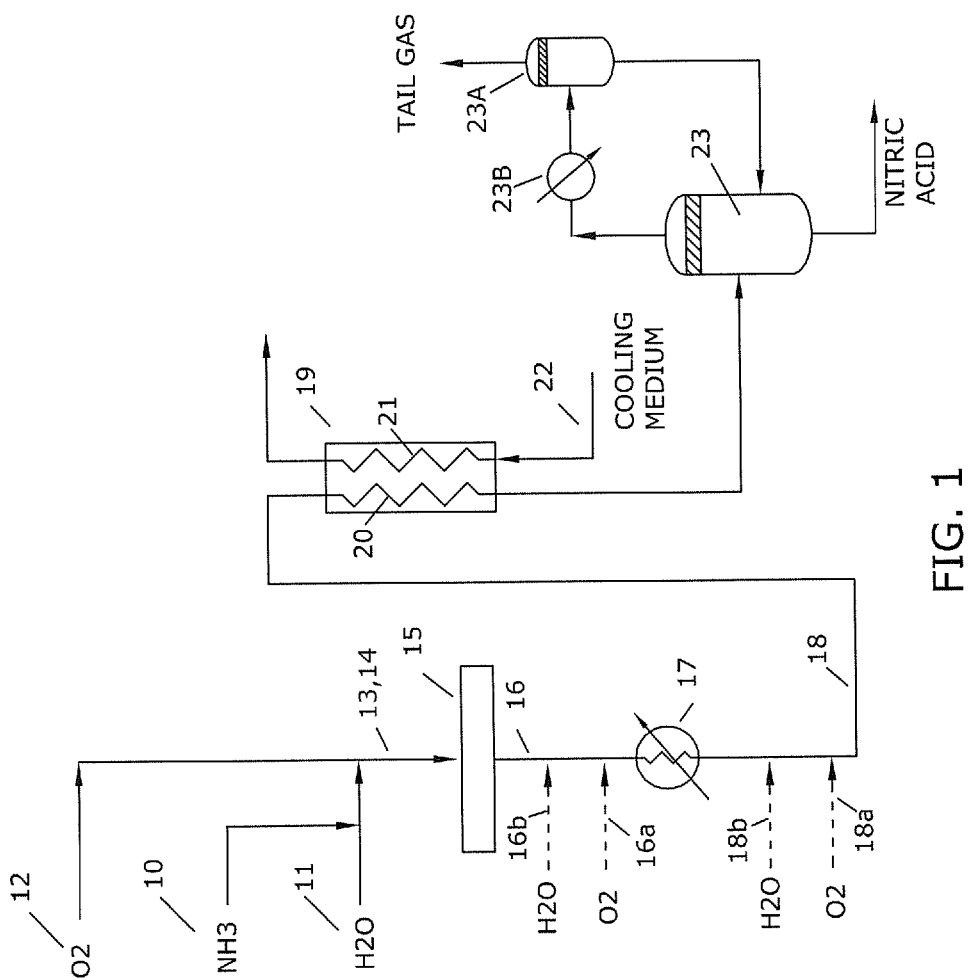
FIG. 1 shows a flow diagram applicable to a first embodiment of the process for producing nitric acid, one in which water, ammonia and oxygen, all in gaseous form, are combined to form a starting feed for the production of the nitric acid.
Figure 2:
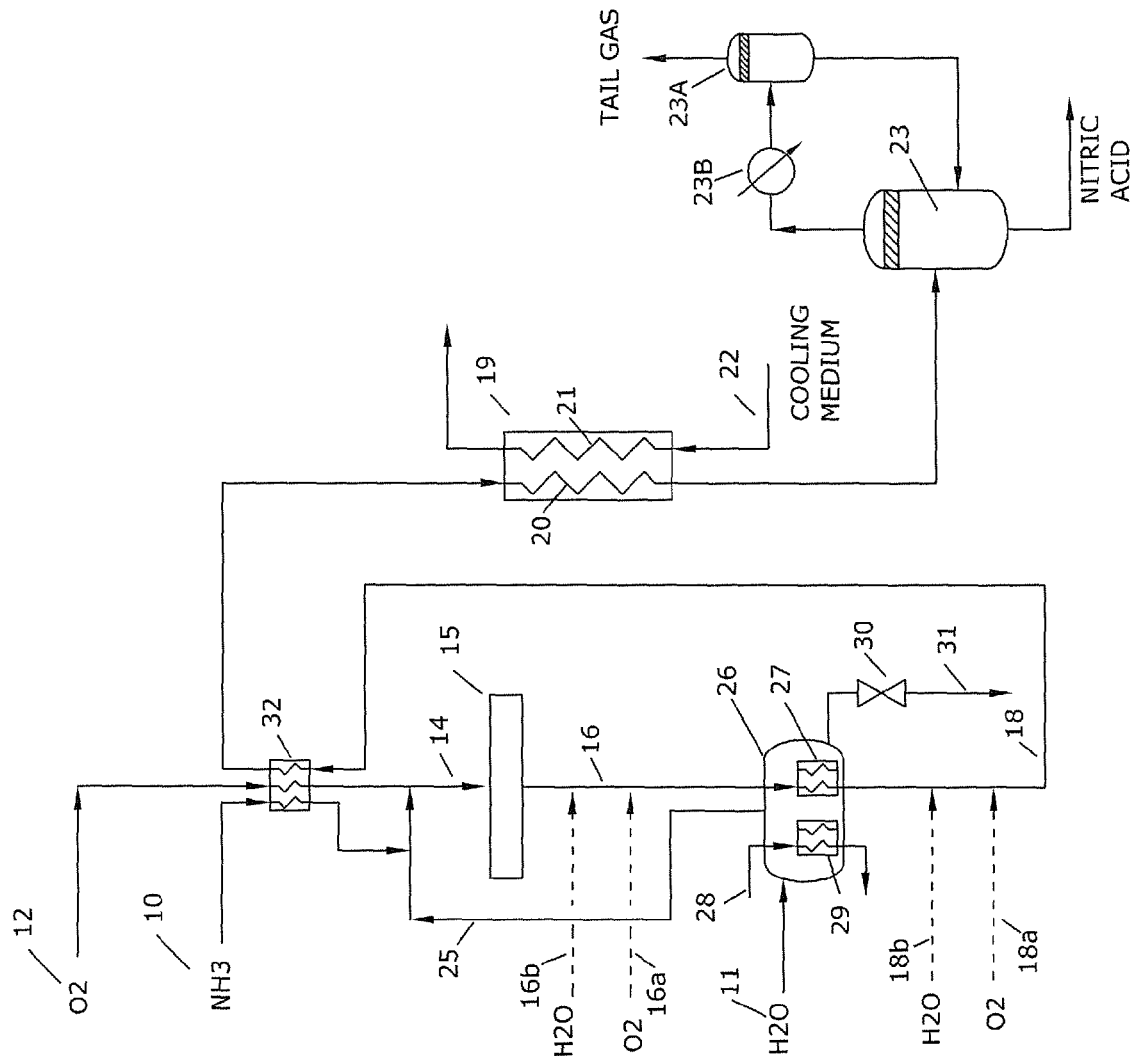
FIG. 2 shows a flow diagram applicable to a second embodiment of the process for producing nitric acid, one in which liquid water is provided as a component of the starting feed and is vaporised to combine with ammonia and oxygen starting feed components.
Figure 3:
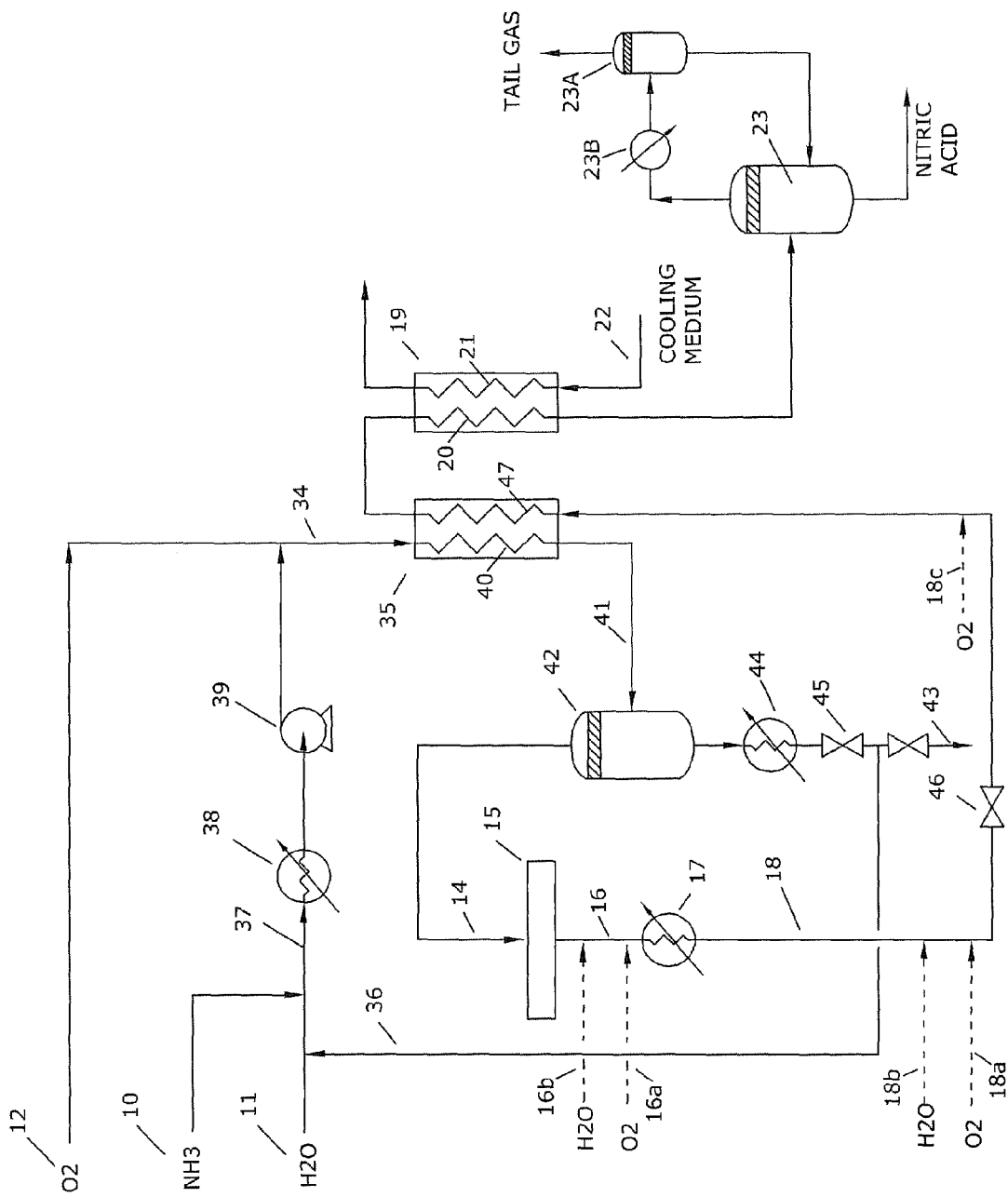
FIG. 3 shows a flow diagram applicable to a third embodiment of the process for producing nitric acid, one in which aqueous ammonia and oxygen components are combined to form a feed which is streamed through a feed-effluent heat exchanger.

The embodiments of the integrated process as illustrated in FIGS. 5 and 6 incorporate the nitric acid producing processes substantially as shown in FIGS. 1 and 3 respectively. However, all three of the nitric acid producing processes of FIGS. 1 to 3 are potentially suitable for use in the integrated system and for this reason are, for completeness, described in detail in the following text.

In the nitric acid producing process illustrated by the flow diagram of FIG. 1, a gaseous ammonia feed stream 10, a steam feed stream 11 and an oxygen feed stream 12 are combined to form a starting feed 13, with the ammonia and steam preferably being mixed ahead of their admission to the oxygen stream to avoid the potential for an explosive mixture. The respective feed streams are delivered at a sufficiently high temperature as to preclude the formation of condensate when a combustor feed 14 (corresponding in the case of the FIG. 1 embodiment to the starting feed 13) is fed to a combustor 15. All feed streams are delivered under a pressure slightly greater than a combustion pressure of about 2 bar (abs.)

The combustor 15 may comprise any type of ammonia oxidiser known in the art for use in high temperature catalytic conversion of an ammonia-oxygen mixture and may employ any known type of catalytic system, including a cobalt oxide bed. In one suitable form it may incorporate a platinum-rhodium catalyst in the form of woven or knitted gauze layers. In another form the combustor may be configured as a heat exchanger-reactor in which heat released during the reaction is transferred simultaneously to a coolant.

The steam-ballasted ammonia-oxygen (combustor) feed 14 to the combustor 15 is heated by a combination of conduction, convection and radiation to the reaction temperature by the catalyst layers and reacts on the catalyst layers to form a nitrous gas stream. Except when oxidation is effected in a heat exchanger-reactor, the overall process is essentially (i.e., nearly) adiabatic and the temperature reached (assuming complete, highly-selective conversion of ammonia to nitrogen monoxide) is primarily a function of the quantity of steam ballast present. The temperature will typically be about 800° C. when the molar ratio of water to ammonia in the starting feed is about 5.6 and the mole fraction of ammonia in the combustor feed is about 11.4%. Such a combustor feed composition lies outside the expected ammonia explosion limits and gives rise to nitric acid product of about 33.5%.

The resultant reaction mixture, including nitrogen monoxide and water vapour, indicated as stream 16, is fed to a following heat exchanger 17 where the reaction mixture is cooled by heat exchange with a heat transfer fluid such as pressurised (liquid) water, boiling water or oil. The heat exchanger 17 as illustrated comprises a quench boiler of a conventional type known in the art and in which the gas feed 16 is cooled to a temperature above the level of dew point (e.g. a temperature of the order of 140° C.).

On exiting from the heat exchanger 17 the cooled reaction mixture 18, in which nitrogen monoxide will have started to oxidise, is fed to an absorber in the form of a heat exchanger 19. Water vapour condensation and continuing oxidation of the nitrogen monoxide and concurrent reactions leading to the formation of nitric acid, in the heat exchanger 19, are governed by the operating pressures and temperatures employed in the system. Heat is exchanged between the cooled reaction mixture (as it proceeds through channels 20 of the heat exchanger 19) and heat exchange fluid 22, typically water, that is directed counter-current though channels 21 of the heat exchanger 19. The heat exchanger 19 may comprise any type of heat exchanger that is known in the art to be suitable for use in condensing/oxidising the reaction mixture feed down to dilute nitric acid, including a shell-and-tube type heat exchanger, a fin-fan type heat exchanger, a plate-type heat exchanger or a printed circuit type heat exchanger, and the heat exchange fluid 22 may comprise any fluid (i.e., liquid or gas) appropriate to the type of heat exchanger that is employed. Fluid flow passages within the heat exchanger desirably have a small cross-sectional dimension (typically less than about 3 mm and, desirably, less than 2 mm equivalent diameter) in order, as previously stated, to assist heat and mass transfer and in order to facilitate heat exchanger and, thus, plant compactness Gases not condensed or absorbed in the heat exchanger are separated from the nitric acid, to form a tail gas, by a separator 23. The principal components of the tail gas will be excess unreacted oxygen, argon and other impurities introduced with the oxygen feed to the process, nitrogen and nitrous oxide formed as by-products in the combustor, and water vapour. The tail gas exiting the separator 23 will also contain very low concentrations of nitrous gases. However, as illustrated, the tail gas may be fed from the separator 23 to a further separator 23A by way of a chiller-condenser 23B, these vessels acting effectively to provide reaction-absorption subsequent to that provided in the heat exchanger 19. Nitrous gases and nitric acid vapour absorbed in the chiller-condenser create a very weak acid stream (typically <2% (w/w)) that is fed back into the separator 23, thereby effectively eliminating the emission of nitric acid vapour and substantially reducing the nitrous oxide emissions from the process whilst also slightly enhancing product yield.

Supplementary oxygen, if required, is injected into the reaction mixture 16 and/or the cooled reaction mixture 18 stream(s), as indicated by dashed feed lines 16a and 18a, in order to provide for a small excess supply of oxygen to facilitate complete oxidation of nitrogen monoxide in the reaction mixture.

Similarly, if required, supplementary steam or water is injected into the reaction mixture 16 and/or the cooled reaction mixture 18 stream(s), as indicated by dashed feed lines 16b and 18b, in order to provide for sufficient condensate to facilitate complete oxidation and absorption of the nitrogen dioxide.

Reference is now made to the nitric acid producing process to which the flow diagram of FIG. 2 applies, in which water 11 is provided as a component of the starting feed and is vaporised before being combined with ammonia and oxygen starting feed components to form the combustor feed 14. Some of the process stages of, and, hence, processing equipment shown in, the flow diagram of FIG. 2 are the same as those of FIG. 1 and are not re-described, and like numerals are used to identify like equipment in the respective figures.

In the process illustrated by FIG. 2 ammonia and oxygen components 10 and 12 of the starting feed are supplied in gaseous form at a pressure slightly greater than the combustor pressure and at near ambient temperature. The water component 11 of the starting feed is supplied in liquid form, again at a pressure slightly greater than the combustor pressure, and the water is vaporised (to form a gaseous stream 25) before mixing firstly with the ammonia starting feed component 10 and then with the oxygen component 12 to form the combustor feed 14.

The water component 11 of the starting feed is heated to its boiling point and vaporised by way of a submerged boiler heat exchanger 26 that receives heat exchange fluid in the form of the reaction mixture 16 by way of a submerged heat exchanger 27, and/or in the form of an externally-sourced heating medium 28 by way of a submerged heat exchanger 29. A valve 30 provides for blowdown 31 to waste in order to avoid build-up of dissolved solids in the heat exchanger 26.

One or the other or (as illustrated) both of the gaseous ammonia and oxygen components 10 and 12 of the starting feed is (or are) heated in a heat exchanger 32 to a temperature that precludes condensing of the vaporised water stream 25 upon mixing into the combustor feed 14. As illustrated, the heat transfer fluid for the heat exchanger 32 comprises the reaction mixture 18 following its passage through (and heat loss/temperature drop in) the submerged heat exchanger 27, although the heat transfer fluid may be sourced externally. In the former case the heat exchanger 32 may be considered as a feed-effluent heat exchanger.

The temperature of the reaction mixture 16 drops to a level of about 140° C. in passing through the heat exchanger 26 and drops further to about 120° C. (i.e., above the dew point) in passing through the heat exchanger 32.

Other aspects of the process illustrated by FIG. 2, including the ammonia oxidation and reaction gas absorption processes, leading to the nitric acid stream 24, are substantially as previously described in the context of FIG. 1.

Reference is now made to the third example embodiment of the nitric acid producing process; that is to the process to which the flow diagram of FIG. 3 applies. Some of the process stages of, and, hence, processing equipment shown in, the flow diagram of FIG. 3 are the same as those of FIGS. 1 and 2 and, as in the case of the FIG. 2 embodiment, are not re-described. Again, like reference numerals are used to identify like equipment in the respective figures.

In the process illustrated by FIG. 3, ammonia 10, water 11 (or, although not shown, aqueous ammonia from a single source) and oxygen 12, all at about ambient temperature, are fed under pressure as an aqueous ammonia-oxygen feed 34 to a feed-effluent heat exchanger 35. The feed 34 may be derived in various ways but, as shown in FIG. 3, the ammonia component 10 of the starting feed at a pressure slightly above atmospheric is dissolved in both the water component 11 of the starting feed and a liquid recycle stream 36 to form an aqueous ammonia stream 37. The aqueous ammonia stream 37 is cooled in a cooler 38 to about 60° C. and pressurised by a pump 39 to a pressure slightly above the combustor pressure, typically, as described previously, at about 2 bar (abs.).

The feed 34 (comprising the aqueous ammonia stream 37 and the oxygen component 12 of the starting feed) is fed to a first channel system 40 of a feed-effluent heat exchanger 35, and the feed 34 in passing through the heat exchanger is heated to a temperature level which permits vaporisation of ammonia and water within the aqueous ammonia stream into the oxygen stream. The resulting steam-ballasted ammonia-oxygen feed is delivered as a combustor feed 41 to the combustor 15 by way of a separator 42.

The separator 42 (which may be of a conventional type known in the art) is provided to remove excess aqueous ammonia that is present in the feed 34 and would otherwise remain in the feed 41 leading to the combustor feed 14. The excess aqueous ammonia is added to the feed 34 to avoid drying-out of feed through the first channel system 40 of the feed-effluent heat exchanger 35 and the build-up of solids/corrosion in the channel system.

The removed liquid may be exhausted from the system simply as a blow-down stream 43 from the separator 42, by way of a cooler 44 and a pressure reducing valve 45, or (in the interest of minimising waste of aqueous ammonia feed) at least a major component of the removed liquid may, as shown, be returned to the starting water feed stream 11 as the recycle stream 36 (as distinct from a starting feed component as such). The blow-down stream 43 is provided for the purpose of avoiding excessive build-up of dissolved solid impurities within the recycle loop and the blow-down stream will typically comprise a small fraction (1% to 10%) of the feed water stream.

All of the feed water (other than that exhausted by the blowdown) is evaporated to form the steam ballast. However, in order to keep the walls on the feed side of the feed-effluent heat exchanger 35 reliably wet, the outlet vapour fraction of the exchanger feed desirably is kept no higher than about 50%, with the residual liquid being recycled to complete the evaporation. The combination of fresh feed and recycle flows produces the excess water on the feed side of the feed-effluent heat exchanger.

The rate of generating steam ballast in the feed-effluent heat exchanger 35 may be controlled by using the control valve 46 to modify the pressure difference between the feed and effluent sides of the exchanger, thereby modifying the amount of heat available from the effluent stream to heat and evaporate the liquid in the feed stream.

The reaction mixture 16 is delivered by way of the quench boiler 17 (which drops the reaction mixture temperature to about 140° C.) and the control valve 46 to a second channel system 47 in the feed-effluent heat exchanger 35, and thence to the series-connected channel system 20 of the heat exchanger 19.

The (relatively) high-temperature reaction mixture feed through the channel system 47 exchanges heat with the counter-flowing aqueous ammonia-oxygen feed through the channel system 40. The graphs of FIG. 4, in showing temperature against heat, illustrate a typical operation of the counter-flow feed-effluent heat exchange that occurs in the feed-effluent heat exchanger 35. Graph A is applicable to the reaction mixture in the channel system 47 as it cools, with condensation of water, and Graph B is applicable to the feed stream undergoing (partial) evaporation of the aqueous ammonia in the channel system 40 during each pass.

The reaction mixture feed (at a reduced temperature of about 60° C.) from the feed-effluent heat exchanger is fed directly into the channel system 20 of the heat exchanger 19 and exchanges heat with the coolant medium 22 counter-flowing through the second channel system 21 of the heat exchanger/absorber 19. The ammonia oxidation and reaction gas absorption processes that occur in the series-connected channel systems 47 and 20 of the feed-effluent heat exchanger 35 and the condensing-absorption heat exchanger 19, leading to the nitric acid stream 24, are substantially as previously described in the context of the processes described with reference to FIGS. 1 and 2.

The quantity (flow rate) of the oxygen component 12 of the starting feed desirably is controlled such that it is sufficient to effect oxidation of all (or substantially all) of the ammonia and nitrous gas in the process. However, in a modification of the process the quantity of oxygen in the starting mixture may be controlled to oxidise at least substantially all of the ammonia and further oxygen may be added to the reaction mixture before water begins to condense from the reaction mixture in order to oxidise substantially all of the nitrous gas. Thus, the further oxygen may be admitted at any one or two or all of the three injection points 16a, 18a and 18c indicated by dashed lines in FIG. 3.

Similarly, the quantity of water in the feed 34 to the feed-effluent heat exchanger 35 is controlled such that, when condensed out from the reaction mixture in the heat exchanger 19 and reacted with (i.e., during absorption of) the derived nitrogen dioxide, the condensate is present in an amount sufficient to form dilute nitric acid having a concentration of the order of 20% to 40%. However, if required, further water (in liquid or gaseous state as appropriate) may be admitted to the reaction mixture and cooled reaction mixture streams at one or both of the two injection points 16b and 18b indicated by the dashed lines in FIG. 3.

It will be understood that the example process that has been described with reference to FIG. 3 effectively embodies a feed-effluent heat exchange system, incorporating the feed-effluent heat exchanger 35, and an absorber heat exchange system incorporating the condensing-absorbing heat exchanger 19. Although not shown as such, the feed-effluent and condensing-absorbing heat exchanger 35 and 19 may be integrated into a single heat exchanger unit.

In the feed-effluent heat exchange system the two-phase feed of aqueous ammonia and oxygen is heated to a temperature which allows the feed stream to the combustor to carry the required amount of ballast steam. On the other side of the exchange, reaction gas which is above the dew point enters the exchanger, is cooled to the dew point and further cooling is accompanied by condensation. Some nitrogen dioxide will be present in the incoming gas as a result of nitrogen monoxide oxidation in feed lines and the quench boiler prior to the feed-effluent heat exchange and, as the temperature and water content of the gas drop within the feed-effluent exchanger, the gas phase nitrogen monoxide oxidation accelerates and a rapidly increasing rate of acid formation will occur within the feed-effluent exchanger as the gases cool. Thus, it is not only water that condenses. In the absorber heat exchange system the process of nitrogen monoxide/nitrogen dioxide oxidation to nitric acid is completed. Coolant fluid lowers the temperature in the absorber-exchanger to a level below that in the feed-effluent exchanger and the residence time of the nitrous gases in the absorber is, by design of the system, sufficient for the oxidation process to run to substantial completion.

Reference is now made to the integrated nitric acid-ammonium nitrate manufacturing processes which are illustrated by way of example in FIGS. 5 to 7.

In general terms and as described in more detail below, FIGS. 5 and 5A illustrate a process in which steam from an ammonium nitrate evaporator in an ammonium nitrate producing stage (hereinafter referred to as the "ammonium nitrate process") is fed back to a nitric acid producing stage (hereinafter referred to as the "nitric acid process") to provide a predominant (if not the total) water component of a combustor feed to a combustor within the nitric acid process. FIG. 5A illustrates an alternative arrangement of components of the ammonium nitrate process that are positioned to the right hand side of the line X-X in FIG. 5, with the components to the left hand side of the line X-X being common to the (complete) integrated process of FIGS. 5 and 5A.

Also in general terms and as described in more detail below, FIGS. 6 and 6A illustrate a process in which steam condensate from an ammonium nitrate evaporator in the ammonium nitrate process is fed (back) to the nitric acid process to provide a predominant (if not the total) water component of a starting feed to the nitric acid process. FIG. 6A illustrates an alternative arrangement of components of the ammonium nitrate process that are positioned to the right hand side of the line X-X in FIG. 6, with the components to the left hand side of the line X-X being common to the (complete) integrated process of FIGS. 6 and 6A.

FIGS. 7 and 7A illustrate alternative heat exchange arrangements for recovering heat from a reaction mixture in the nitric acid process and for supplementing heat available to the ammonium nitrate process.

The nitric acid process within the integrated process of FIGS. 5 and 5A is similar to that which has been described previously with reference to FIG. 1 and like reference numerals are employed to indicate like (or analogous) equipment components in the respective figures.

In the nitric acid process of FIG. 5, ammonia and oxygen components 10 and 12 of a starting feed are supplied in gaseous form at a pressure slightly greater than a following combustor pressure and at near ambient temperature. A water component of the feed is supplied as a gaseous stream 50 (i.e., as steam from the ammonium nitrate process) in which the ammonia and, then, oxygen streams are mixed to form the combustor feed 14 which is supplied to a combustor 15. The combustor may comprise any one of the oxidisers described above with reference to FIGS. 1 to 3 as suitable for high temperature catalytic conversion of the ammonia-oxygen mixture.

The resultant reaction mixture, including nitrogen monoxide and water vapour, indicated as stream 16, is fed to a following heat exchanger 17 where the reaction mixture is cooled by heat exchange with a heat transfer fluid that couples (as indicated by connection A-A) with a reactor/evaporator (heat exchanger) 51 in the ammonium nitrate process.

On exiting from the heat exchanger 17 the partially cooled reaction mixture 18, in which nitrogen monoxide will start to oxidise, is fed by way of heat exchangers 52 and 53 to an absorber in the form of the heat exchanger 19. (The heat exchanger 53 corresponds with and performs the same function as the heat exchanger 32 as illustrated in FIG. 2.)

Either one or, as shown, both of the gaseous ammonia and oxygen components 10 and 12 of the starting feed is (or are) heated in the heat exchanger 53, by heat transfer from the reaction mixture 18 to a temperature that precludes any condensing of the vaporised water stream 50 upon mixing with that stream.

The temperature of the reaction mixture 16 drops to a level of about 140° C. in passing through the heat exchanger 17 and drops further to about 120° C. (i.e., above the dew point) in passing through the heat exchangers 52 and 53.

Water vapour condensation and continuing oxidation of the nitrogen monoxide to nitrogen dioxide and concurrent reactions leading to the formation of nitric acid, in the heat exchanger 19, are (as previously described) governed by the operating pressures and temperatures employed in the system. Heat is exchanged between the cooled reaction mixture (as it proceeds through channels 20 of the heat exchanger 19) and heat exchange fluid 22, typically water, which is directed counter-current though channels 21 of the heat exchanger 19.

As also described above the heat exchanger 19 may comprise any type of heat exchanger that is known in the art to be suitable for use in condensing/oxidising the reaction mixture feed down to dilute nitric acid. Gases that are not condensed or absorbed in the heat exchanger are separated from the nitric acid, to form a tail gas 54, by the separator 23, resulting in the nitric acid stream 24.

Other aspects of the nitric acid process illustrated by FIG. 5, including the ammonia oxidation and reaction mixture absorption processes, are substantially as previously described in the context of FIGS. 1 and 2.

As illustrated in FIG. 5, the dilute (e.g., about 33.5%) nitric acid stream 24-55 from the phase separator 23, at about the absorber pressure, is pumped by pump 56 to a pressure slightly above that in the reactor/evaporator 51 (to allow for pressure drops through the intervening equipment), and is pre-heated by heat transfer from the reaction mixture stream 18 in the heat exchanger 52.

The hot, pressurised nitric acid stream 55 is then mixed with a gaseous ammonia feed 58, at a similar pressure, giving rise to the reaction to form ammonium nitrate 59 (e.g., at about 39%) and the release of reaction heat. Sufficient ammonia is fed to the ammonium nitrate reactor/concentrator 51 to maintain an excess of ammonia in the ammonium nitrate solution. Also, sufficient heat is added to the nitric acid stream 55 in the heat exchanger 52 to ensure that part of the reaction heat released by the ammonium nitrate reaction generates steam, with the remainder of the evaporation heat to the reactor/evaporator 51 being provided by heat transfer from the heat exchanger 17 via coupling loop A-A.

The nitric acid stream 55 and the ammonia stream 58 mix within the ammonium nitrate reactor/evaporator 51 in order to integrate the reaction and evaporation processes, and thereby avoid any phase distribution problems in passing from the reactor to what would otherwise be a separate evaporator.

The two phase ammonium nitrate-steam mixture 59 from the reactor/evaporator 51 is fed to a gravity separator vessel 57, from which emerges ammonium nitrate solution 60 (e.g., at about 80%) and a steam stream 61 for return to the nitric acid process as steam feed 50. A demister pad 62 is located within the separator vessel 57 and is employed to assist the disengagement of liquid droplets, containing ammonium nitrate, from the steam. To avoid the build-up of ammonium nitrate solids on the pad it is sprayed with water from stream 63.

Because the pressure in the separator 57 is slightly higher than the pressure in the combustor 15, steam may flow from the vessel to the combustor without assistance from mechanical compression. Should the flow of steam emerging from the separator 57 exceed the steam ballast requirements of the nitric acid process, excess steam may be vented as steam 64, leaving the steam 50 to pass to the nitric acid process.

Due to the steam feed stream 61 contacting the liquid water stream 63 on demister pad 62, it may not be superheated. Thus at least one or the other, or (as shown) both, of the ammonia 10 and oxygen 12 feed streams is (or are) heated by the nitric acid reaction mixture in heat exchanger 53, to ensure that the combustor feed mixture 14 is superheated and does not contain water droplets which might impinge on the combustor catalyst.

A reaction/evaporation scheme as shown in FIG. 5A comprises an alternative to that which has been described with reference to FIG. 5. In this scheme the ammonium nitrate reactor may simply be a length of adiabatic pipe 51A, with the two-phase ammonium nitrate solution stream 59, only partially concentrated by evaporation arising from reaction heat, discharging into separator vessel 57. The evaporation process is completed within the vessel 57 (which effectively becomes an evaporator/separator vessel) by heat delivered by a submerged evaporator/heat exchanger 65, which is coupled to the heat exchanger 17 to receive heat transfer fluid by way of the loop A-A. In other respects the scheme shown in FIG. 5A is similar to that shown in FIG. 5.

Reference is now made to the integrated process as illustrated by way of the example embodiment shown in FIGS. 6 and 6A. The nitric acid process within the illustrated integrated process is similar to that which has been described previously with reference to FIG. 3 and like reference numerals are employed to indicate like (or analogous) equipment components in the respective figures. Similarly, the ammonium nitrate process (within the integrated process) is similar to that which has been described with reference to FIGS. 5 and 5A and, again, like reference numerals are employed to indicate like components.

Thus, in the nitric acid process of FIG. 6, ammonia 10 and oxygen 12 feed components at about ambient temperature, are fed under pressure as an aqueous ammonia-oxygen starting feed 34 to a feed-effluent heat exchanger 35. The ammonia component 10 of the starting feed at a pressure slightly above atmospheric is dissolved in a mixture of condensed steam 66 that is returned from the ammonium nitrate process (as described below) and a liquid recycle stream 36 to form an aqueous ammonia stream 37. The aqueous ammonia stream 37 is cooled in a cooler 38 to about 60° C. and pressurised by a pump 39 to a pressure slightly above a following combustor pressure.

The feed 34 (comprising the aqueous ammonia stream 37 and the oxygen component 12 of the starting feed) is fed to a first channel system 40 of a feed-effluent heat exchanger 35, and the feed 34 in passing through the heat exchanger is heated to a temperature level which permits vaporisation of the ammonia and water within the aqueous ammonia stream into the oxygen stream. The resulting steam-ballasted ammonia-oxygen feed is delivered as the vapour fraction of a feed 41 to the combustor 15 by way of a separator 42, from which the combustor feed 14 emerges.

The separator 42 functions to remove excess aqueous ammonia that is added to the feed 34 and would otherwise remain in the combustor feed 14. The removed liquid may be exhausted from the system simply as a blow-down stream 43 from the separator 42, by way of a heat exchanger 44 and a pressure reducing valve 45 or, as shown, be returned to the water feed stream as the recycle stream 36.

The reaction mixture 16 from the combustor 15 is delivered by way of a heat exchanger 17 and, as a reduced temperature stream 18, by way of a control valve 46 to a second channel system 47 in the feed-effluent heat exchanger 35, and thence to a series-connected channel system 20 of the heat exchanger 19.

As previously described in the context of FIG. 3, the control valve 46 is located in circuit between the heat exchanger 17 and the reaction mixture feed 18 to the feed-effluent heat exchanger 35 for adjusting the pressure of the reaction mixture feed, for the purpose of regulating the amount of steam raised to provide the required degree of ballast.

Figure 4:
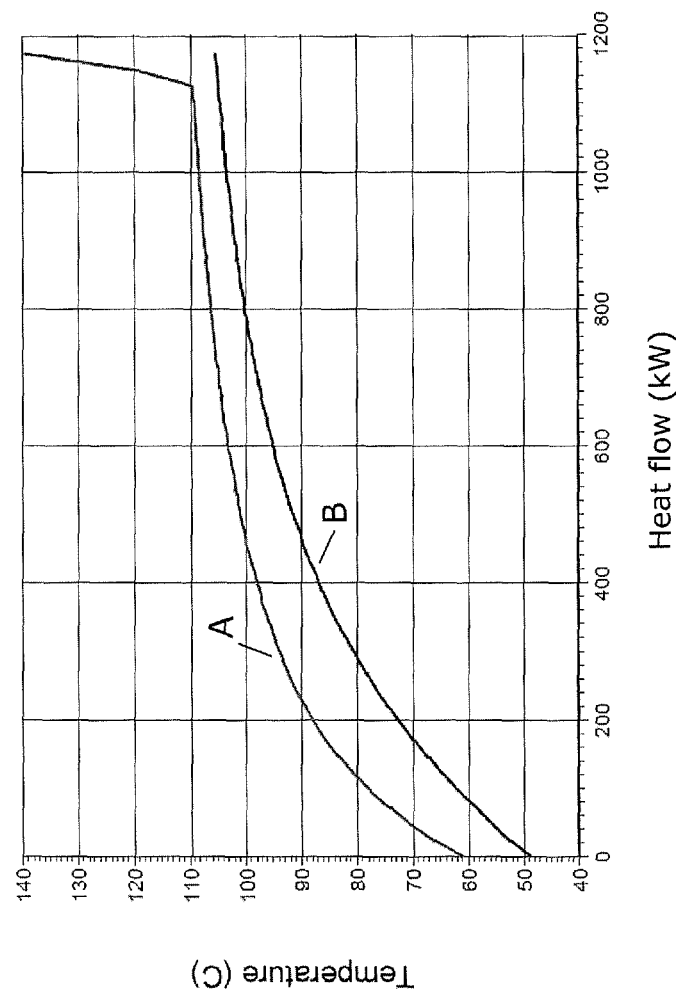
FIG. 4 shows graphs, of temperature against heat, that illustrate a typical operation of counter-flow feed-effluent heat exchange in the heat exchanger shown in FIG. 3.

The (relatively) high-temperature reaction mixture feed 18 passes through the channel system 47 of the feed-effluent heat exchanger 35 exchanging heat with the counter-flowing aqueous ammonia-oxygen feed passing through the channel system 40. As previously indicated, again in the context of FIG. 3, the graphs of FIG. 4 illustrate a typical operation of the counter-flow feed-effluent heat exchange that occurs.

The reaction mixture feed 18 (at a reduced temperature) from the feed-effluent heat exchanger 35 is fed directly into the channel system 20 of the heat exchanger 19 and exchanges heat with the coolant medium 22 counter-flowing through the second channel system 21 of the condenser-absorber 19. The ammonia oxidation and reaction gas absorption processes that occur in the series-connected channel systems 47 and 20 of the feed-effluent heat exchanger 35 and the condensing-absorption heat exchanger 19 are as previously described in the context of the nitric acid process described with reference to FIGS. 1 to 3.

As shown in FIG. 6, a dilute (about 33.5%) nitric acid stream 32 from the condensing-absorber heat exchanger 19 is fed to the phase separator 23 from which non-condensable gases are vented as stream 54, leaving the gas-free nitric acid stream 24 at about the absorber pressure. The pressure of the nitric acid stream 24 is then reduced through valve 67 to a pressure slightly above that in the reactor/evaporator 51 (to allow for pressure drops through the intervening equipment), and is then pre-heated by the weak aqueous ammonia stream 48 in heat exchanger 44.

The hot, low-pressure nitric acid stream 55 is mixed with gaseous ammonia stream 58, at a similar pressure, in the ammonium nitrate reactor/evaporator (heat exchanger) 51, giving rise to the reaction to form ammonium nitrate (at about 39%) and the generation of heat. Sufficient ammonia is fed to the ammonium nitrate reactor/evaporator to maintain an excess of ammonia in the alkaline ammonium nitrate solution.

Also, sufficient heat is added to the nitric acid stream 55 in heat exchanger 44 to ensure that part of the ammonium nitrate reaction heat generates steam, with the remainder of the evaporation heat in the reactor/evaporator 51 being provided by heat transfer from the heat exchanger 17 via coupling loop A-A, which recovers heat from the reaction mixture 18.

The heat transfer loop A-A may, for example, be a boiling/condensing water loop or a pressurised, single-phase water loop.

As previously described in the context of the FIG. 5 embodiment, the nitric acid stream 55 and ammonia stream 58 mix within the ammonium nitrate reactor-evaporator 51 in order to integrate the reaction and evaporation processes. The two phase ammonium nitrate-steam mixture 59 is fed to the evaporator gravity separator vessel 57, from which emerges the ammonium nitrate solution 60 (at about 80%) and steam stream 61. A demister pad 62 is employed to assist the disengagement of liquid droplets, containing ammonium nitrate, from the steam and, to avoid the build-up of ammonium nitrate solids on the pad it is sprayed with water from a stream 63.

The steam stream 61 is condensed in a condenser 68 to form a liquid water condensate stream which may carry with it small level of entrained non-condensable gases, such as hydrogen and nitrogen, which may have entered the process as impurities in ammonia stream 58. When such a level of entrained gases might give rise to operational problems in the down-stream pump 39, they may be vented from a separator vessel 69 as stream 70, to leave the (de-gassed) condensate steam 66.

Should the flow of water from the separator 69 as stream 66 exceed the steam ballast requirements of the nitric acid process, or be deficient in that respect, then liquid water may be removed or added as stream 71 to provide the appropriate flow rate of water in starting stream 34 to ballast the nitric acid process.

The stream 66 then mixes with the recycle stream 36 (weak aqueous ammonia) in the nitric acid process prior to absorbing the ammonia feed stream 10.

The resultant aqueous ammonia stream 37 will be approximately 7% ammonia and, thus, the nitric acid ammonia feed stream need only be slightly above 0.5 bar (abs.) (i.e., below atmospheric pressure) in order to be fully absorbed by the water feed. Normally, however, both the separator vessel 69 and the ammonia feed stream 10 would operate at slightly above atmospheric pressure, rather than in vacuum.

The reaction-evaporation scheme as shown in FIG. 6A is an alternative to the scheme shown to the right of the line X-X in FIG. 6. In this scheme (as in that of FIG. 5A) the ammonium nitrate reactor may simply be a length of adiabatic pipe 51A, with the two-phase ammonium nitrate solution stream 59, only partially concentrated, discharging into the separator vessel 57. Within vessel 57 the evaporation process is completed by a submerged evaporator 65, which is coupled to the heat exchanger 17 by the heat transfer loop A-A.

FIG. 7 shows an arrangement in which additional heat from an external source (not shown) is applied to single-phase heat transfer loop A-A by a hot stream 71 in heat exchanger 72. FIG. 7A shows an alternative arrangement in which additional steam is raised for boiling/condensing heat transfer loop A-A by a submerged heat exchanger 73 which receives heat from an external hot stream 74.

Other variations and modifications may be made in the integrated ammonium nitrate process without departing from the scope of the process as above described and claimed in the following claims.

The invention claimed is:

1. A method for producing ammonium nitrate, comprising:
providing a non-explosive gaseous oxidiser feed comprising ammonia, steam and an oxidising gas to a reactor;
in the reactor, oxidising the ammonia of the non-explosive gaseous oxidiser feed to produce a reaction mixture comprising nitrogen monoxide and water vapour;
providing the reaction mixture to a heat exchanger;
in the heat exchanger, cooling the reaction mixture and conducting a reaction-absorption process in which (i) the nitrogen monoxide is oxidised to produce one or more oxidation products, (ii) the water vapour is condensed to liquid water and (iii) the one or more oxidation products react with and are absorbed by the liquid water to form nitric acid in a nitric acid stream, wherein substantially all of the nitrogen monoxide in the reaction mixture is converted to the nitric acid in the nitric acid stream, and wherein the concentration of nitric acid in the nitric acid stream is from about 20% to 40% on a weight basis (w/w); providing the nitric acid stream to an additional reactor; and
in the additional reactor, reacting the nitric acid in the nitric acid stream with ammonia to form an ammonium nitrate solution comprising the ammonium nitrate and water,
wherein during formation of the ammonium nitrate solution, heat is (i) recovered from the reaction mixture above its dew point and (ii) applied to the ammonium nitrate solution to evaporate water from the ammonium nitrate solution, such that the ammonium nitrate solution is produced with an ammonium nitrate concentration from about 75% to 85% w/w, and
wherein water that is evaporated from the ammonium nitrate solution is recycled so as to comprise at least a portion of the steam of the non-explosive oxidiser feed.

2. The method of claim 1, wherein the oxidising gas comprises a gas containing at least 90% oxygen.

3. The method of claim 2, wherein at least 95% of the nitrogen monoxide in the reaction mixture is converted to nitric acid.

4. The method of claim 3, wherein the non-explosive gaseous oxidiser feed comprises oxidising gas in an amount that is sufficient to oxidise all of the ammonia to nitrogen monoxide.

5. The method of claim 1, wherein water that is evaporated from the ammonium nitrate solution is recycled so as to comprise the predominant portion of the steam of the non-explosive gaseous oxidiser feed.

6. The method of claim 1, wherein water that is evaporated from the ammonium nitrate solution is recycled so as to comprise the total amount of steam of the non-explosive gaseous oxidiser feed.

7. The method of claim 4, wherein water that is evaporated from the ammonium nitrate solution is recycled so as to comprise the total amount of the steam of the non-explosive gaseous oxidiser feed.

8. The method of claim 4, further comprising continuing the reaction-absorption process in a reactor-absorber subsequent to the heat exchanger.

9. The method of claim 8, wherein the reactor-absorber is an adiabatic reactor-absorber.

10. The method of claim 1, further comprising, prior to providing the non-explosive oxidiser feed, (i) providing an aqueous ammonia starting feed comprising ammonia and water, and (ii) heating the aqueous ammonia starting feed to a temperature that permits at least partial vaporisation of the ammonia and water of the aqueous ammonia starting feed.

11. The method of claim 10, wherein the heating of the aqueous ammonia starting feed is effected in a counterflow feed-effluent heat exchanger by heat exchange with the reaction mixture which is cooled from a temperature above its dew point to a temperature below its dew point, wherein heat exchanged in the feed-effluent heat exchanger is predominantly low-grade heat exchanged below the dew point of the reaction mixture.

12. The method of claim 11, wherein about 90% of the heat exchanged in the feed-effluent heat exchanger is low-grade below the dew point of the reaction mixture.

13. The method of claim 1, further comprising concentrating the ammonium nitrate solution by exchanging heat between the reaction mixture and the ammonium nitrate solution directly.

14. The method of claim 1, further comprising concentrating the ammonium nitrate solution by exchanging heat between the reaction mixture and the ammonium nitrate solution indirectly using an intermediate coupling loop of a heat transfer medium.

15. The method of claim 14, wherein the heat transfer medium comprises a boiling/condensing water circuit or a single-phase pressurized water circuit.

16. The method of claim 1, wherein no external source of heat is applied to the ammonium nitrate solution.

17. The method of claim 4, wherein no external source of heat is applied to the ammonium nitrate solution.

18. The method of claim 7, wherein no external source of heat is applied to the ammonium nitrate solution.

19. The method of claim 1, wherein an external source of heat is applied to the ammonium nitrate solution in addition to the heat recovered from the reaction mixture.

20. The method of claim 4, wherein an external source of heat is applied to the ammonium nitrate solution in addition to the heat recovered from the reaction mixture.

21. The method of claim 7, wherein an external source of heat is applied to the ammonium nitrate solution in addition to the heat recovered from the reaction mixture.

22. A method for producing ammonium nitrate, comprising:
providing a non-explosive gaseous oxidiser feed comprising ammonia, steam and an oxidising gas to a reactor;
in the reactor, oxidising the ammonia of the non-explosive gaseous oxidiser feed to produce a reaction mixture comprising nitrogen monoxide and water vapour;
providing the reaction mixture to a heat exchanger;
in the heat exchanger, cooling the reaction mixture and conducting a reaction-absorption process in which (i) the nitrogen monoxide is oxidised to produce one or more oxidation products, (ii) the water vapour is condensed to liquid water and (iii) the one or more oxidation products react with and are absorbed by the liquid water to form nitric acid in a nitric acid stream, wherein substantially all of the nitrogen monoxide in the reaction mixture is converted to the nitric acid in the nitric acid stream, and wherein the concentration of nitric acid in the nitric acid stream is from about 20% to 40% on a weight basis (w/w); providing the nitric acid stream to an additional reactor; and
in the additional reactor, reacting the nitric acid in the nitric acid stream with ammonia to form an ammonium nitrate solution comprising the ammonium nitrate and water,
wherein during formation of the ammonium nitrate solution, heat is (i) capable of being recovered from the reaction mixture above its dew point and (ii) capable of being applied to the ammonium nitrate solution to evaporate water from the ammonium nitrate solution, such that the ammonium nitrate solution is capable of being produced with an ammonium nitrate concentration from about 75% to 85% w/w, and
wherein water that is evaporated from the ammonium nitrate solution is recycled so as to comprise the total amount of steam of the non-explosive oxidiser feed.

23. The method of claim 22, wherein the oxidising gas comprises a gas containing at least 90% oxygen.

24. The method of claim 23, wherein at least 95% of the nitrogen monoxide in the reaction mixture is converted to nitric acid.

25. The method of claim 24, wherein the non-explosive gaseous oxidiser feed comprises oxidising gas in an amount that is sufficient to oxidise all of the ammonia to nitrogen monoxide.

26. The method of claim 25, further comprising continuing the reaction-absorption process in a reactor-absorber subsequent to the heat exchanger.

27. The method of claim 22, further comprising, prior to providing the non-explosive oxidiser feed, (i) providing an aqueous ammonia starting feed comprising ammonia and water, and (ii) heating the aqueous ammonia starting feed to a temperature that permits at least partial vaporisation of the ammonia and water of the aqueous ammonia starting feed.

28. The method of claim 22, further comprising concentrating the ammonium nitrate solution by exchanging heat between the reaction mixture and the ammonium nitrate solution directly.

29. The method of claim 22, further comprising concentrating the ammonium nitrate solution by exchanging heat between the reaction mixture and the ammonium nitrate solution indirectly using an intermediate coupling loop of a heat transfer medium.

30. The method of claim 22, wherein no external source of heat is applied to the ammonium nitrate solution.

31. The method of claim 22, wherein an external source of heat is applied to the ammonium nitrate solution in addition to the heat recovered from the reaction mixture.

* * * * *